United States Patent
Ross (10) Patent No.: US 9,641,472 B2
(45) Date of Patent: *May 2, 2017

(54) TRACKING CONVERSATION THREADS AMONG ELECTRONIC COMMUNICATIONS

(71) Applicant: International Business Machines Corporation, Armonk, NY (US)

(72) Inventor: Martin A. Ross, Gosport (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,374

(22) Filed: Oct. 20, 2016

(65) Prior Publication Data

US 2017/0034096 A1 Feb. 2, 2017

Related U.S. Application Data

(63) Continuation of application No. 15/189,006, filed on Jun. 22, 2016, now Pat. No. 9,521,099, which is a continuation of application No. 15/065,985, filed on Mar. 10, 2016, now Pat. No. 9,426,111, which is a continuation of application No. 14/736,481, filed on Jun. 11, 2015.

(51) Int. Cl.
*G06F 15/16* (2006.01)
*H04L 12/58* (2006.01)
*H04L 29/08* (2006.01)

(52) U.S. Cl.
CPC ............. *H04L 51/16* (2013.01); *H04L 51/04* (2013.01); *H04L 67/22* (2013.01)

(58) Field of Classification Search
CPC ......... H04L 51/04; H04L 51/16; H04L 51/36; H04L 67/22
See application file for complete search history.

(56) References Cited

U.S. PATENT DOCUMENTS

| 7,222,299 B1 | 5/2007 | Lim et al. |
| 7,930,356 B2 | 4/2011 | Gawor et al. |

(Continued)

OTHER PUBLICATIONS

"Embedded Conversation Trackers in EMails", An IP.com Prior Art Database Technical Disclosure, IP.com No. 000214722, Publication: Feb. 3, 2012, 6 pages.

(Continued)

*Primary Examiner* — Jonathan Bui
(74) *Attorney, Agent, or Firm* — Daniel R. Simek (57) ABSTRACT

A method for identifying a conversation thread among electronic communications. The method includes a computer processor identifying that a user is accessing a first electronic communication from a plurality of electronic communications. The method further includes a computer processor analyzing meta-data of the first electronic communication to identify a unique identifier included in the meta-data. The method further includes a computer processor determining that the unique identifier is associated with content included in the first electronic communication that was copied from a second electronic communication. The method further includes a computer processor providing the user that is accessing the first electronic communication access to the second electronic communication.

1 Claim, 5 Drawing Sheets

(56) References Cited

U.S. PATENT DOCUMENTS

| | | | |
|---|---|---|---|
| 8,583,654 | B2 | 11/2013 | Palay |
| 8,725,813 | B2 | 5/2014 | Nalliah et al. |
| 9,043,410 | B2 * | 5/2015 | MacDonald ............ H04L 51/04 709/206 |
| 2008/0109462 | A1 * | 5/2008 | Adams ................. G06Q 10/107 |
| 2009/0070294 | A1 * | 3/2009 | Chijiiwa ................ G06Q 10/10 |
| 2009/0234924 | A1 | 9/2009 | Edelen et al. |
| 2012/0110092 | A1 | 5/2012 | Keohane et al. |
| 2012/0221638 | A1 | 8/2012 | Edamadaka et al. |
| 2012/0239761 | A1 | 9/2012 | Linner et al. |
| 2013/0006973 | A1 | 1/2013 | Caldwell et al. |

OTHER PUBLICATIONS

"Senseful Solutions: How does email threading work in Gmail?", Aug. 1, 2010, 2 pages, <www.sensefulsolutions.com/2010/08/how-does-email-threading-work-in-gmail.html>.

"Clipboard API and events", Copyright 2014 W3C®, W3C Working Draft Dec. 9, 2014, 15 pages, <http.//www.w3.org/TR/clipboard-apis/#event-types-and-details>.

Oldenburg, Michael C., "Using Microsoft OneNote 2010", Captured Mar. 31, 2015, 1 page, <http://books.google.co.uk/books?id=HKyV9g-d1zMC&pg=PT444&lpg=PT444&dq=pasted+text+clickable+link+to+source&source=bl&ots=IIM7dwvP8P&sig=pG-tNY3aWTJH-6uBI7__JjtrLUh4&hl=en&sa=X&ei=dMhYVI7IAY7saNH-gPAK&ved=0CFEQ6AEwBg#v=onepage&q=pasted%20text%20clickable%20link%20to%20source&f=false>.

List of IBM Patents or Patent Applications Treated as Related, Appendix P, 2 pages, Filed Apr. 26, 2016.

Ross, et al., "Tracking Conversation Threads Among Electronic Communications", U.S. Appl. No. 14/736,481, filed Jun. 11, 2015.

Ross, et al., "Tracking Conversation Threads Among Electronic Communications", U.S. Appl. No. 15/065,985, filed Mar. 10, 2016.

Ross, et al., "Tracking Conversation Threads Among Electronic Communications", U.S. Appl. No. 15/189,006, filed Jun. 22, 2016.

* cited by examiner

TRACKING CONVERSATION THREADS AMONG ELECTRONIC COMMUNICATIONS

BACKGROUND OF THE INVENTION

The present invention relates generally to the field of electronic communications, and more particularly to tracking conversation threads between electronic communications.

Developments in electronics and computing technology have resulted in a proliferation of computing devices of varying sizes and capabilities for business and personal use. Similarly, the number of electronic communication modes have multiplied in response to the proliferation of computing devices, business and personal needs, and the expected speed of responses. Many business, social, governmental, and academic enterprises utilize electronic communications as the primary communication mode. Electronic communications include: electronic mail (i.e., e-mail), text messages, instant messages, calendar functions (e.g., schedule meetings, reminders, etc.), and task functions (e.g., to-dos, assignments, delegation). Electronic communications do not rely on information being provided serially, by a single user. The content within an electronic communication can originate from a plurality of sources and be comprised of various information types. For example, a received e-mail can contain content, such as plain text, audio files, video files, hyperlinks, document files, databases, content copied from other electronic communications, etc. Subsequently, a user may modify the received e-mail to include additional content and transmit (e.g., forward, reply) the received e-mail to another user.

SUMMARY

According to an aspect of the present invention, there is a method, computer program product, and/or system method for identifying a conversation thread among electronic communications. The method includes one or more computer processors identifying that a user is accessing a first electronic communication from a plurality of electronic communications. The method further includes one or more computer processors analyzing meta-data of the first electronic communication to identify a unique identifier included in the meta-data. The method further includes one or more computer processors determining that the unique identifier is associated with content included in the first electronic communication that was copied from a second electronic communication. The method further includes one or more computer processors providing the user that is accessing the first electronic communication access to the second electronic communication.

DETAILED DESCRIPTION

Embodiments of the present invention recognize that some electronic communication systems provide a user a log or a depiction of the chain of electronic communications that preceded the user receiving an electronic communication. However, a user may be restricted (e.g., constrained) from viewing the identities of some or all of the users within the chain of other users that were directly associated with the electronic communication. Content (e.g., information) that is copied from one electronic communication and added to another electronic communication may lose the contextual association (e.g., conversation thread) or an actual association with the electronic communication that is the source of the copied content.

Embodiments of the present invention also recognize that a user may want to trace an electronic communication by conversation threads as opposed to the communication chain associated with the electronic communication. However, a user may file associated electronic communications in deeply nested folders or may archive some of the associated electronic communications, increasing the time and difficulty to manually trace a conversation thread. Embodiments of the present invention recognize that conversation threads may form based on interactions of multiple users and be unrelated to the subject lines of electronic communications. Conversion threads may form via the content copied from one electronic communication and pasted to another electronic communication. Copied content may include: text, attachments, links, etc.

Embodiments of the present invention provide a method to include additional meta-data associated with an electronic communication that is the source of copied content and include the additional metadata in an electronic communication incorporating the copied content. In addition, embodiments of the present invention utilize one or more unique identifiers to determine one or more conversation threads within an electronic communication chain. In some embodiments, a tree data structure may describe the path of: the electronic communications, the copied content, and the associated conversation threads, where each node may represent an electronic communication. A selected node may be identified as the "parent" node with the subsequent nodes (e.g., electronic communications) being "child" nodes. Similarly, if a user traces the tree structure in the opposite direction, the current node is a "child" of a previous "parent" node. A user may display the one or more conversation threads based on various user preferences. A user may select an electronic conversation to read from the identified electronic communications within a conversation thread. In addition, embodiments of the present invention may constrain (e.g., restrict) which conversation threads may be traced by a user and how far a conversation thread may be traced. For example, a user is restricted to view the electronic communications that the user received (e.g., directly, carbon copied, forwarded, etc.) or that the user sent (e.g., originated, replied to, forwarded, carbon copied, blind carbon copied, etc.). A user may not trace a thread beyond an electronic communication that is directly associated with a user.

In other embodiments, a user may be able to trace, but not access, electronic communications that contain content that originated with the user, but the user was not included in at least one step of the communication chain. In some instances, an electronic communication may contain a unique identifier; however, the electronic communication and/or associated copied content may originate from a different computing system (e.g., server, enterprise system, etc.) and not be accessible to a user.

Some embodiments of the present invention utilize a unique identifier, such as a universally unique identifier (UUID). The UUID is an identifier standard used in software construction. In one embodiment, a UUID is a 128-bit value. In another embodiment, a UUID may be comprised of a different number of bits. The meaning of each bit is defined by any of several variants. A UUID specification covers a particular variant. Each UUID variant may be further defined by a version identifier. For example, a version 4 UUID scheme utilizes random numbers. The intent of UUIDs is to enable distributed systems to uniquely identify information without significant central coordination. In this context, the word unique should be taken to mean "practically unique" rather than "guaranteed unique." The identifier size and generation process is selected to make duplicating a UUID sufficiently improbable in practice. Information labeled with UUIDs can, therefore, be later combined, indexed, or cross-reference within a database without needing to resolve identifier (ID) conflicts.

Additional embodiments of the present invention recognize that the amount of meta-data associated with a portion of copied content may be reduced and obfuscated to improve security, especially with unencrypted electronic communications, by utilizing multiple UUIDs. Associating a UUID with the non-essential meta-data associated with the copied content, and in some instances the electronic communication itself, can permit the non-essential meta-data to be stored separate from the electronic communications.

In another embodiment, the content itself may be identified by a UUID and stored separate from the electronic communication. In a different embodiment, the UUID is a method to link (e.g., access) secured content. Users not authorized in the cross-reference/database do not receive the content. In some instances, the content is volatile and expires, deletes, etc., when the electronic communication is closed or the link is broken to the server or system containing the content linked to the UUID. In yet another embodiment, the UUID is a link to content that is itself associated with security. In one scenario, a UUID may represent: a security classification, an approval requirement, a digital approval certificate, an intellectual property (IP) approval, a licensing notification, etc. In another scenario, combinations of UUID's may provide a user a method paste information or approvals with a secure digital signature. For example, to ensure security and prevent "spoofing", the combination of UUIDs that are cross-referenced (e.g., indexed) are a user's UUID, a UUID for the computing device assigned to the user, and a UUID associated with a registered electronic communication program on the computing device of a user. In another example, a user may engage in an authentication process to obtain a "certified" temporary UUID if the user communicates via a computing device and an electronic communication program not registered to the user.

The descriptions of the various scenarios, instances, and examples related to the present invention have been presented for purposes of illustration but are not intended to be exhaustive or limited to the embodiments disclosed.

Figure 1:
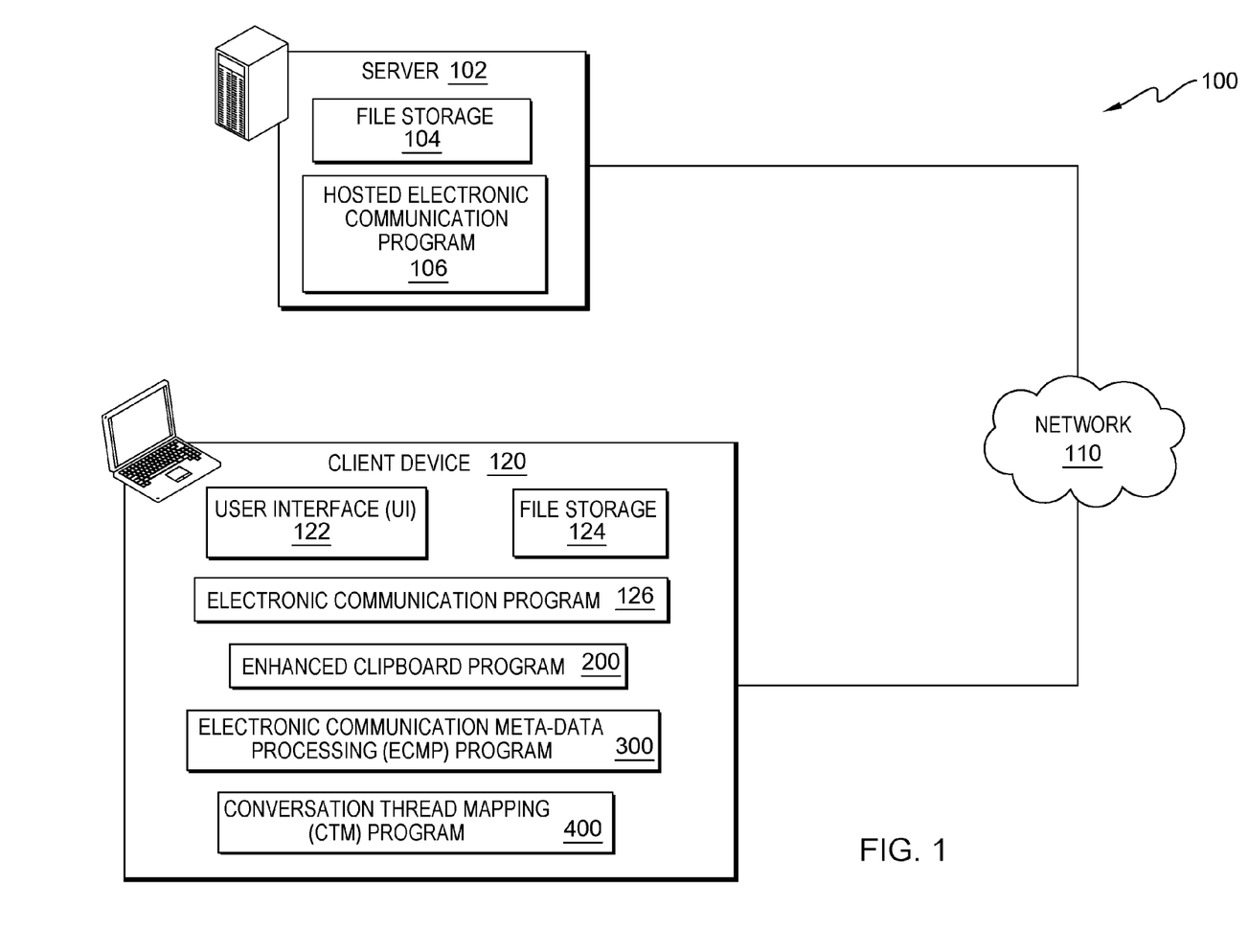
FIG. 1 illustrates a distributed data processing environment, in accordance with an embodiment of the present invention.

The present invention will now be described in detail with reference to the Figures. FIG. 1 is a functional block diagram illustrating distributed data processing environment 100 in an embodiment, in accordance with the present invention. An embodiment of distributed data processing environment 100 includes server 102 and client device 120, interconnected over network 110. Many modifications to the depicted environment may be made by those skilled in the art without departing from the scope of the invention as recited by the claims.

Server 102 and client device 120 may be a laptop computer, a tablet computer, a netbook computer, a personal computer (PC), a desktop computer, a personal digital assistant (PDA), a smart phone, a wearable device (e.g., digital eyeglasses, smart glasses, a smart watch), or any programmable computer system known in the art. In certain embodiments, server 102 and client device 120 represent computer systems utilizing clustered computers and components (e.g., database server computers, application server computers, etc.) that act as a single pool of seamless resources when accessed through network 110, as is common in data centers and with cloud-computing applications. In general, server 102 and client device 120 are representative of any programmable electronic device or combination of programmable electronic devices capable of executing machine readable program instructions and communicating with client computers, such as client device 120, via network 110. Server 102 may include components, as depicted and described in further detail with respect to FIG. 5, in accordance with embodiments of the present invention.

Server 102 includes file storage 104, hosted electronic communication program 106, and may include various programs (not shown). In some embodiments, server 102 may contain one or more databases that maintain cross-referencing information (e.g., indexes) that associates unique identifiers to electronic communications created by various electronic communications programs and the databases within file storage 104 that include the electronic communications.

In some embodiments, file storage 104 contains databases and log files that store electronic communications. One or more databases within file storage 104 include the cross-referenced, unique identifier information for electronic communications. In one scenario, file storage 104 is part of an enterprise-based office environment. For example, file storage 104 includes databases that store electronic communications, such as e-mails and calendar entries for an enterprise-based e-mail client (e.g., hosted electronic communication program 106) and calendar clients. In another embodiment, file storage 104 is the server-side storage for electronic communication program 126 on client device 120. For example, file storage 104 periodically replicates with file storage 124 on client device 120. In a different scenario, file storage 104 supports web-based e-mail clients, calendar clients, etc. Electronic communication meta-data processing (ECMP) program 300 can access file storage 104 to store processed electronic communications. Conversation thread mapping (CTM) program 400 can also access file storage 104 to determine conversation threads and access authority for electronic communications.

In addition, file storage 104 may include various user preferences in the event that a user utilizes programs or applications external to client device 120 to create an electronic communication and which generates an instance of user interface (UI) 122 specific to that external program or application. The user preferences stored within file storage 104 may be different from user preferences stored in file storage 124.

In one embodiment, client device 120 and server 102 communicate through network 110. Network 110 can be, for example, a local area network (LAN), a telecommunications network, a wireless local area network (WLAN), a wide area network (WAN), such as the Internet, or any combination of the previous, and can include wired, wireless, or fiber optic connections. In general, network 110 can be any combination of connections and protocols that will support communications between client device 120 and server 102, in accordance with embodiments of the present invention. In another embodiment, network 110 operates locally via wired, wireless, or optical connections and can be any combination of connections and protocols (e.g., near field communication (NFC), laser, infrared, etc.).

Client device 120 includes user interface (UI) 122, file storage 124, enhanced clipboard program 200, electronic communication meta-data processing (ECMP) program 300, conversation thread mapping (CTM) program 400, electronic communication program 126, and may include various programs (not shown). Examples of programs (not shown) that client device 120 includes are: an e-mail client, a word processor, a web browser, a multi-media player, security software (e.g., a firewall program, an encryption program, etc.), an instant messaging (IM) application (app), and a communication (e.g., phone) application. A user of client device 120 can interact with UI 122 via a singular device, such as a touch screen (e.g., display) that performs both input to a graphical user interface (GUI) and as an output device (e.g., a display) presenting a plurality of icons associated with software applications or images depicting the executing software application. Optionally, a software application (e.g., a web browser) can generate UI 122 operating within the GUI of client device 120. UI 122 may accept input from a plurality of input/output (I/O) devices (not shown) including, but not limited to, a tactile sensor interface (e.g., a touch screen, a touchpad) or a natural user interface (e.g., voice control unit, motion capture device, etc.). An I/O device interfacing with UI 122 may be connected to client device 120 which may operate utilizing wired (e.g., USB port) or wireless network communications (e.g., infrared, NFC, etc.). For example, an I/O device may be a peripheral, such as a keyboard, a mouse, a trackball, and a click wheel that provide input from a user.

In one embodiment, file storage 124 contains databases and log files which store the electronic communications received by a user of client device 120 and/or sent by the user of client device 120. In one scenario, file storage 124 contains the databases and log files associated with electronic communication program 126. In another scenario, file storage 124 contains replica databases and log files associated with hosted electronic communication program 106 on server 102. In another embodiment, file storage 124 includes the cross-referenced unique identifier information associated with electronic communications received by a user of client device 120 and/or sent by the user of client device 120. In some embodiments, file storage 124 includes user preferences utilized by enhanced clipboard program 200, electronic communication meta-data processing (ECMP) program 300, and conversation thread mapping (CTM) program 400.

Enhanced clipboard program 200 is a program that provides additional functionality to obtain meta-data from an electronic communication that is not included with a basic clipboard utility (e.g., function) on client device 120. In one embodiment, enhanced clipboard program 200 is a stand-alone program that executes on client device 120. In one scenario, enhanced clipboard program 200 replaces the functionality of a basic clipboard utility (e.g., included in the operating system (not shown)) of client device 120. In another scenario, enhanced clipboard program 200 executes concurrently with a basic clipboard utility on client device 120 and copies the same data that the basic clipboard utility copies. Enhanced clipboard program 200 may interact with various electronic communication programs (e.g., electronic communication program 126). In another embodiment, enhanced clipboard program 200 may be a function included with an electronic communication program (e.g., an e-mail program, an office productivity suite, an enterprise communication program, etc.). In one example, enhanced clipboard program 200 is included in electronic communication program 126. In another example, enhanced clipboard program 200 is included in hosted electronic communication program 106.

Electronic communication meta-data processing (ECMP) program 300 is a program that incorporates (e.g., pastes) the content and extracted meta-data, copied by enhanced clipboard program 200, from one electronic communication to another electronic communication. In one embodiment, ECMP program 300 is utilized to process a new electronic communication. In another embodiment, ECMP program 300 is utilized to process previously created electronic communications. In some embodiments, ECMP program 300 obtains a unique identifier that is added to the meta-data of an electronic communication in addition to the one or more unique identifiers associated with related electronic communications and/or the one or more unique identifiers included in the meta-data for content pasted into the electronic communication via enhanced clipboard program 200.

Conversation thread mapping (CTM) program 400 is a program that provides a user the capability to trace one or more conversation threads associated with an electronic communication that the user can access by utilizing unique identifiers incorporated in the meta-data of the electronic communication. CTM program 400 interfaces with one or more electronic communications. In one embodiment, CTM program 400 processes the display of electronic communications and conversation threads within GUI depicted within UI 122. In another embodiment, CTM program 400 utilizes the GUI associated with an electronic communication program (e.g., electronic communication program 126) to display electronic communications and conversation threads. In some embodiments, CTM program 400 is constrained to map (e.g., trace) within a computing system (e.g., an enterprise system). In some instances, CTM program 400 is further constrained to a selection of servers. For example, a plurality of businesses utilize the same cloud-computing provider. However, the electronic communication programs respectively associated with each business executes within unique servers (e.g., virtual machines) within the virtualized computing system of the cloud-computing provider. In one embodiment, CTM program 400 constrains the mapping and/or access to electronic communications associated with a conversation thread to the electronic communications that are directly associated with the user. For example, direct association includes: sending, receiving, forwarding, replying, etc.

Figure 2:
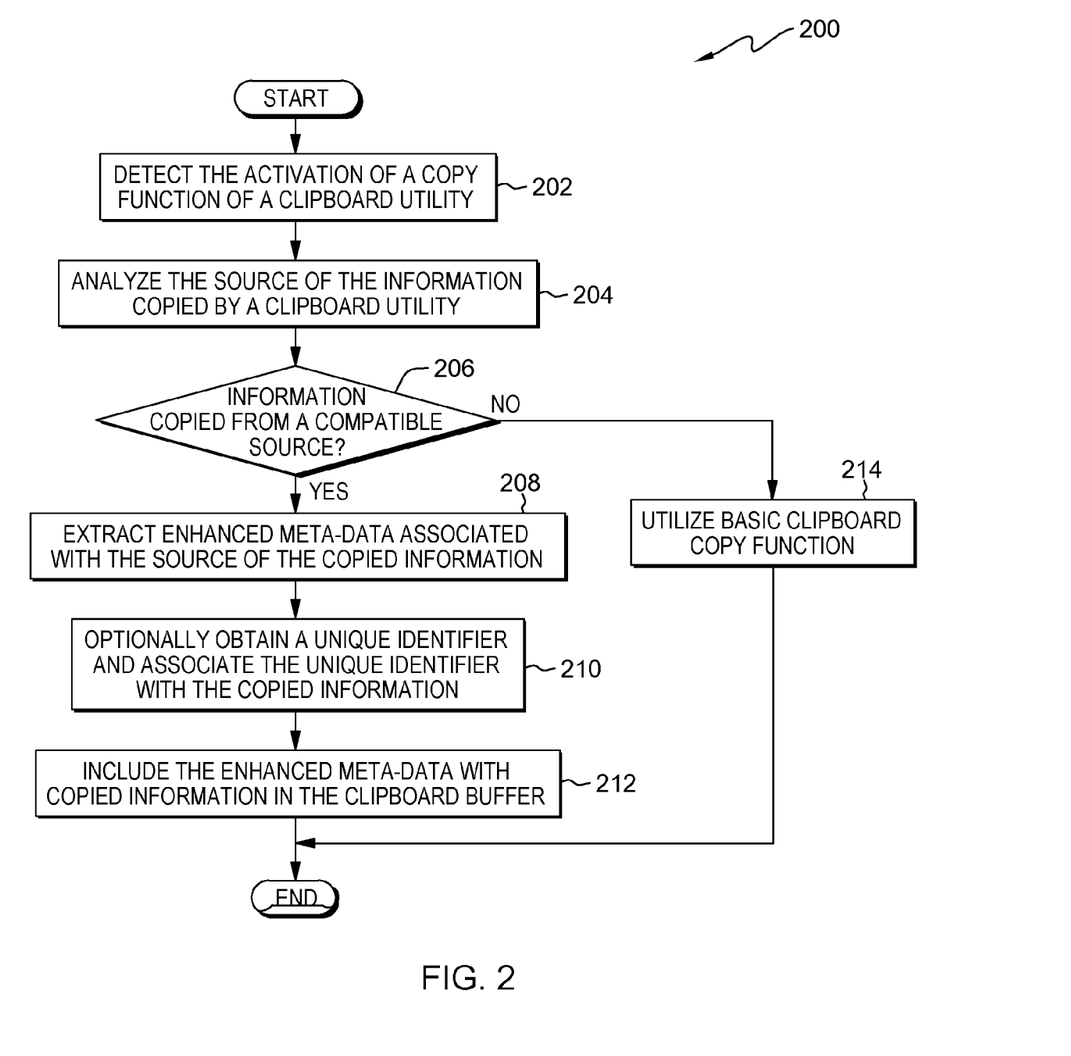
FIG. 2 depicts a flowchart of the operational steps of an enhanced clipboard program, in accordance with an embodiment of the present invention.

FIG. 2 is a flowchart depicting operational steps for enhanced clipboard program 200, a program for obtaining meta-data and a unique identifier from one electronic communication, as part of a copy operation, to be subsequently added to another electronic communication, as part of a paste operation, in accordance with embodiments of the present invention.

In step 202, enhanced clipboard program 200 detects activation of the copy function of a clipboard utility. For example, the activation of the copy function of a clipboard utility may be triggered by a hot-key combination, a dropdown menu, etc. In one embodiment, enhanced clipboard program 200 is a utility that is part of electronic communication program 126 executing on client device 120. In another embodiment, enhanced clipboard program 200 is a stand-alone utility provided by the GUI of client device 120 and presented to a user via UI 122. In yet another embodiment, enhanced clipboard program 200 may be a utility provided by server 102 that supports hosted electronic communication program 106. In one scenario, enhanced clipboard program 200 is a utility (e.g., a plug-in) for a web browser (not shown) that accesses hosted electronic communication program 106 on server 102. In another scenario, enhanced clipboard program 200 is a utility that is part of hosted electronic communication program 106 on server 102. In some embodiments, enhanced clipboard program 200 operates concurrently with a basic clipboard utility available on client device 120. Copied information may exist concurrently within enhanced clipboard program 200 and the basic clipboard utility available on client device 120.

In step 204, enhanced clipboard program 200 analyzes the source of the information that is copied by a clipboard utility. In one embodiment, enhanced clipboard program 200 determines whether the source (e.g., an e-mail, a SMS, an IM, etc.) of the information copied to the clipboard includes a unique identifier (e.g., a UUID, a serial number, etc.). Additionally, enhanced clipboard program 200 may determine which software program generated the electronic communication that is the source of the copied information and which computing hardware (e.g., server) executes the software program that generated the source (e.g., electronic communication) of the copied information. For example, enhanced clipboard program 200 can determine whether an electronic communication is generated by an instance of hosted electronic communication program 106 executing on server 102 (e.g., an enterprise computing system) or whether the electronic communication is generated by another instance of hosted electronic communication program 106 executing on a different server (not shown) accessible via network 110.

In decision step 206, enhanced clipboard program 200 determines whether the information copied by a clipboard utility is copied from a compatible source. In one embodiment, enhanced clipboard program 200 determines that information copied by a clipboard program is from a compatible source when the electronic communications are constrained to occur within a specific server, computing cluster, or enterprise computing environment. For example, electronic communication program 126 is a client-side interface for hosted electronic communication program 106 executing on server 102. In one scenario, electronic communications generated by programs hosted within server 102 are cross-compatible and possess unique identifiers. In another scenario, electronic communication compatibility is constrained to electronic communication created by instances of the same application on the same server (e.g., electronic communication program 126 executing on server 102). In another embodiment, enhanced clipboard program 200 may determine that copied information is compatible between the same application executing on multiple servers. For example, information copied from e-mails generated via the same web-app are compatible.

Referring to decision step 206, in a different embodiment, enhanced clipboard program 200 may determine that information copied by a clipboard utility is not copied from a compatible source (decision step 206, no branch). In one scenario, enhanced clipboard program 200 determines that the copied information originated from a web-app e-mail and transmitted to an enterprise-based electronic communication program. In one instance, enhanced clipboard program 200 determines that the web-app e-mail is not compatible due to the unique identifier. In one example, enhanced clipboard program 200 determines that the web-app e-mail does not include a unique identifier. In another instance, enhanced clipboard program 200 determines that the unique identifier is a different structure. For example, the web-app e-mail utilizes a time stamp serial number, and the enterprise application utilizes a UUID. In another example, enhanced clipboard program 200 determines that the UUID of web-app e-mail is based on a UUID version 1 definition as opposed to the enterprise-based electronic communication program that is based on a UUID version 2 definition. In another scenario, enhanced clipboard program 200 determines that the copied information is not compatible based on the type of information. For example, in some instances, copied information, such as images, videos, etc. included within an electronic communication may have a unique identifier that differs from the unique identifier of the electronic communication.

In decision step 206, in response to a determination that information is copied from a compatible source (yes branch, decision step 206), enhanced clipboard program 200 extracts the meta-data associated with the source of the copied information (step 208).

In step 208, enhanced clipboard program 200 extracts enhanced meta-data from the source of the copied information. In one embodiment, enhanced clipboard program 200 accesses the electronic communication that supplied the copied information and extracts (e.g., identifies and copies) meta-data. In one scenario, enhanced clipboard program 200 extracts enhanced meta-data for the current electronic communication where the enhanced (relevant) metadata may include: a unique identifier (e.g., a UUID), a subject line, an author, other users carbon copied on the electronic communication, an IP address, a host name, etc. In another scenario, enhanced clipboard program 200 analyzes the extracted (e.g., identified and copied) meta-data and applies one or more system and/or user preferences to determine which enhanced meta-data is included with the copied information and which meta-data is filtered. For example, enhanced clipboard program 200 may determine that one or more system preferences prevents tracking cookies from inclusion and that IP and host name information is anonymized from the perspective of a user but exists for the purpose of cross-referencing (e.g., indexing) at a system level.

In step 210, enhanced clipboard program 200 optionally obtains a unique identifier and associates the unique identifier with the copied information. In some embodiments, enhanced clipboard program 200 utilizes the obtained unique identifier as a reference to the meta-data. Utilizing unique identifiers, enhanced clipboard program 200 enables the meta-data associated with electronic communication an enhanced level of security by obfuscating related information. In one scenario, ECMP program 300 may subsequently include the unique identifier within a processed electronic communication and separately send the meta-data and associated unique identifier to a server for isolation and storage. For example, server 102 contains a database that indexes, cross-references, and stores the meta-data associated with the unique identifiers of the pasted content, the unique identifiers of the electronic communications containing segments (e.g., pasted content) from one or more conversation threads, and the pasted content from one or more conversation threads.

In step 212, enhanced clipboard program 200 includes the enhanced meta-data with the copied information in the clipboard buffer. In one embodiment, enhanced clipboard program 200 includes the extracted enhanced meta-data with the copied information in the clipboard buffer. In another embodiment, enhanced clipboard program 200 includes the analyzed enhanced meta-data which may be filtered or modified by one or more system and/or user preferences. In a further embodiment, enhanced clipboard program 200 includes the unique identifier (e.g., a UUID), obtained in step 210, with the meta-data in the clipboard buffer.

Referring to decision step 206, in response to a determination that the information was not copied from a compatible source (no branch, decision step 206), enhanced clipboard program 200 utilizes a basic clipboard function (step 214).

In step 214, enhanced clipboard program 200 utilizes a basic clipboard copy function for the copied data. In one embodiment, enhanced clipboard program 200 replaces a system or application clipboard function and constrains the capabilities of enhanced clipboard program 200 to that of the basic clipboard copy function. In another embodiment, enhanced clipboard program 200 executed concurrently with a system or application clipboard function. Enhanced clipboard program 200 deletes the copy buffer and associated source information obtained by enhanced clipboard program 200 and permits the system or application clipboard function to resume operations.

Figure 3:
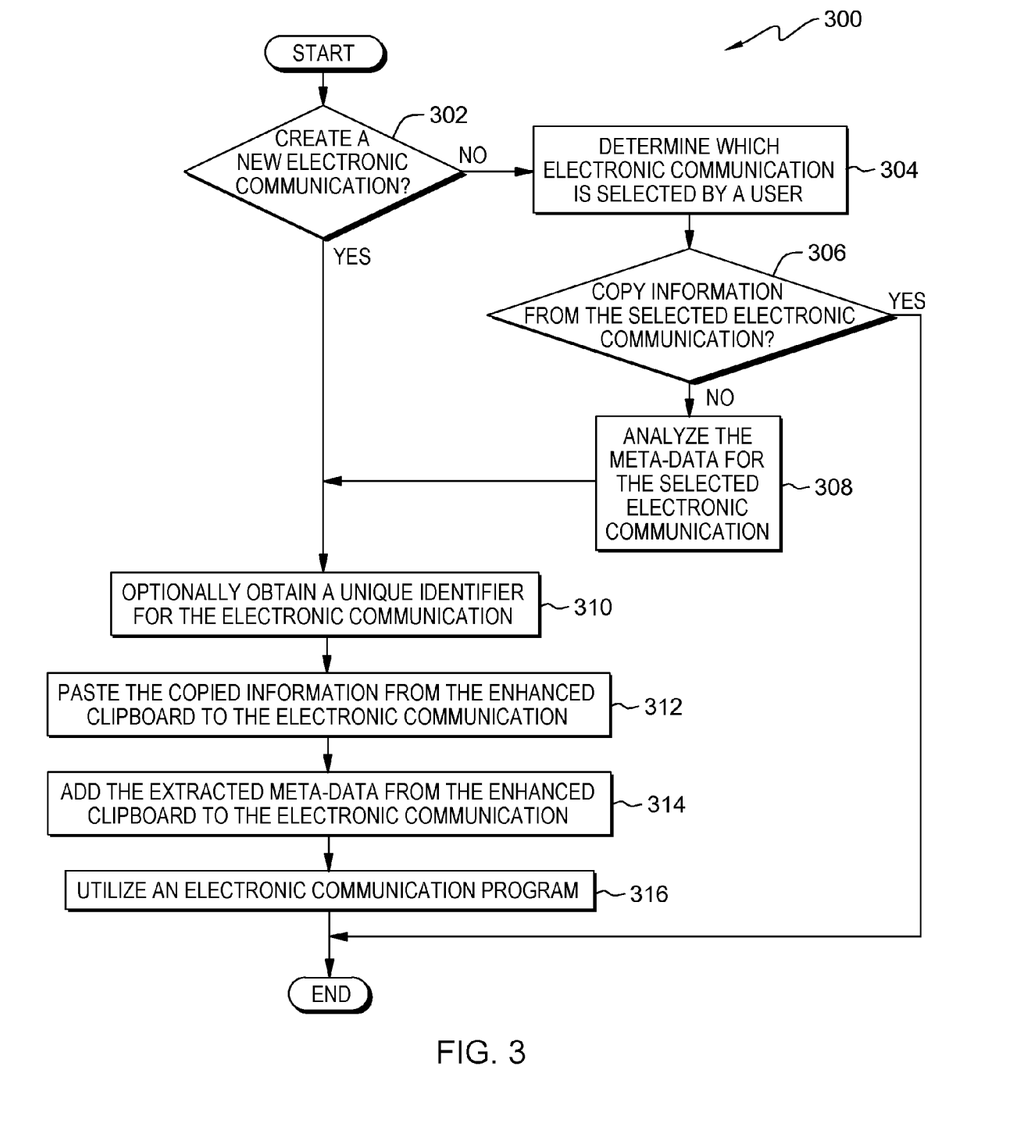
FIG. 3 depicts a flowchart of the operational steps of an electronic communication meta-data processing program, in accordance with an embodiment of the present invention.

FIG. 3 is a flowchart depicting operational steps for ECMP program 300, a program for incorporating meta-data obtained from an enhanced clipboard utility (e.g., enhanced clipboard program 200) into another electronic communication, in accordance with embodiments of the present invention. In some embodiments, multiple instances of ECMP program 300 may execute concurrently.

In decision step 302, ECMP program 300 determines whether a user of client device 120 creates a new electronic communication. In one embodiment, ECMP program 300 determines that the user of client device 120 creates a new electronic communication. In one scenario, ECMP program 300 determines that a user of client device 120 utilizes electronic communication program 126 (e.g., an office productivity suite) to create an electronic communication (e.g., an e-mail). In another scenario, ECMP program 300 determines that a user of client device 120 utilizes hosted electronic communication program 106 (e.g., a server-based enterprise application) to create an electronic communication (e.g., an e-mail). In some embodiments, ECMP program 300 may determine that a user of client device 120 utilizes another electronic communication program (not shown), such as a web-based communication program. In another embodiment, ECMP program 300 determines that the user of client device 120 does not create a new electronic communication. In one scenario, ECMP program 300 determines that a user of client device 120 selects an electronic communication from a plurality of stored electronic communications. For example, ECMP program 300 may determine that a user of client device 120 utilizes hosted electronic communication program 106 to select an e-mail stored within a project folder. In another scenario, ECMP program 300 determines that a user of client device 120 selects an electronic communication from among one or more received electronic communications that have not been processed.

In other embodiments, the determination of whether ECMP program 300 identifies a draft electronic communication as a new electronic communication or as a stored electronic communication is based on how a specific electronic communication program processes an electronic communication. For example, if a draft electronic communication includes meta-data or identifiers that indicate that the electronic communication is forwarded or replied to, ECMP program 300 identifies the electronic communication as a stored and/or received. In another example, if ECMP program 300 determines that there is minimal meta-data associated with a draft electronic communication, then ECMP program 300 may identify the draft electronic communication as new.

In decision step 302, in response to a determination that a user of client device 120 does not create a new electronic communication (no branch, decision step 302), ECMP program 300 determines which stored or received (e.g., unprocessed) electronic communication is selected by a user of client device 120 (step 304).

In step 304, ECMP program 300 determines which electronic communication is selected by a user. In one embodiment, ECMP program 300 determines that a user of client device 120 utilizes electronic communication program 126 to access a selection of electronic communications. In one scenario, a user of client device 120 utilizes electronic communication program 126 to select an electronic communication from a list of received electronic communications (e.g., from the Inbox of an e-mail program). In another scenario, a user of client device 120 utilizes electronic communication program 126 to select an electronic communication from a list of stored electronic communications (e.g., a Sent folder, an Education folder, a Project folder, etc.). In some instances, the stored and/or received electronic communications may be stored within file storage 124 on client device 120. In another instance, the stored and/or received electronic communications are stored within file storage 104 on server 102. In some instances, the stored and/or received electronic communications reside within file storage 104 and file storage 124, respectively, on server 102 and client device 120, and the electronic communications are periodically synchronized, replicated, and/or backed-up. In another embodiment, ECMP program 300 may determine that a user of client device 120 utilizes hosted electronic communication program 106 on server 102 to access a selection of stored and/or received electronic communications.

In decision step 306, ECMP program 300 determines whether a user copies information from the selected electronic communication. If ECMP program 300 determines that a user copies information from the selected electronic communication (yes branch, decision step 306), then ECMP program 300 terminates, and the copied information is processed by enhanced clipboard program 200. For example, multiple instances of ECMP program 300 may execute concurrently, permitting a user to utilize one or more electronic communication programs. A user may also process (e.g., browse, delete, send, file, receive, open, etc.) multiple electronic communications, and a user may copy information from one or more electronic communications.

In decision step 306, in response to a determination that a user does not copy information from the selected electronic communication (no branch, decision step 306), ECMP program 300 analyzes the metadata for the selected electronic communication (step 308). In one example, ECMP program 300 may determine that a user of client device 120 forwards a previously processed (e.g., stored, filed, etc.) electronic communication to another user. In another example, ECMP program 300 may determine that the user of client device 120 replies to (e.g., processes) a received electronic communication and carbon copies (i.e., cc) a different user.

In step 308, ECMP program 300 analyzes the meta-data for the selected electronic communication. In one embodiment, ECMP program 300 may determine from the analysis of meta-data of an electronic communication that the electronic communication is the beginning of a conversation thread. In one scenario, ECMP program 300 determines that the electronic communication is the beginning of a conversation thread based on the meta-data including a single unique identifier. In another scenario, ECMP program 300 determines that the electronic communication is the beginning of a conversation thread based on the meta-data not including one or more indications that the electronic communication was forwarded to the user of client device 120 from another user as opposed to the author (e.g., sender) of the electronic communication.

In another embodiment, ECMP program 300 may determine that an electronic communication is part of one or more existing conversation threads based on the analysis of the meta-data. In one scenario, ECMP program 300 determines that an electronic communication is part of an ongoing conversation thread based on identifying two or more unique identifiers within the meta-data for an electronic communication. In another scenario, ECMP program 300 determines that an electronic communication is part of an ongoing conversation thread based on identifying multiple instances of a type of meta-data (e.g., subject line, time and date stamps, sender information, etc.) that are included within the electronic communication. In some embodiments, ECMP program 300 may determine that two or more instances of appended meta-data are included in the electronic communication.

In a further embodiment, ECMP program 300 may determine that an electronic communication contains meta-data which, upon further analysis, indicates the electronic communication contains pasted content originating from at least two different conversation threads.

Referring to decision step 302, in response to determining that a user creates a new electronic communication (yes branch, decision step 302), ECMP program 300 optionally obtains a unique identifier for the electronic communication (step 310).

In step 310, ECMP program 300 optionally obtains a unique identifier for the electronic communication. In one embodiment, ECMP program 300 may obtain a unique identifier for a new electronic communication from electronic communication program 126 executing on client device 120. In one scenario, ECMP program 300 obtains a unique identifier for the new electronic communication, such as a random UUID or a serial number, from electronic communication program 126. In another scenario, ECMP program 300 obtains a unique identifier for a new electronic communication, such as a random UUID or a serial number that server 102 issues to electronic communication program 126 upon the creation of a new electronic communication. In some instances, ECMP program 300 receives a unique identifier for the new electronic communication based on electronic communication program 126 being a client-side version of an enterprise-based electronic communication program (e.g., hosted electronic communication program 106). In other instances, when client device 120 cannot communicate with server 102, ECMP program 300 receives a unique identifier generated by electronic communication program 126 as opposed to server 102. The unique identifier is subsequently registered with server 102 to prevent duplication when communication resumes between client device 120 and server 102 and to cross-reference (e.g., index) the different electronic communication.

Referring to step 310, in some embodiments, ECMP program 300 may not obtain a unique identifier for an electronic communication. In one scenario, ECMP program 300 determines, from the analysis of the meta-data associated with an electronic communication (step 308), that an electronic communication is a stored and/or received electronic communication and that the electronic communication program utilized to select a stored/received electronic communication assigned a unique identifier as part of the selection process. In this instance, ECMP program 300 does not obtain a unique identifier for the electronic communication. For example, ECMP program 300 determines that electronic communication program 126 responds to a user replying to or forwarding a selected electronic communication as if the electronic communication is a different electronic communication and assigns the forwarded electronic communication a unique identifier.

In step 312, ECMP program 300 pastes the copied information from enhanced clipboard program 200 to the electronic communication. In one embodiment, ECMP program 300 pastes the copied information of enhanced clipboard program 200 without alteration. In another embodiment, ECMP program 300 pastes the copied information from enhanced clipboard program 200 utilizing additional options. In one example, ECMP program 300 pastes the copied information from enhanced clipboard program 200 such that the information is depicted as the formatting of the electronic communication as opposed to the formatting of the information source. In another example, ECMP program 300 pastes the copied information from enhanced clipboard program 200 with another modification (e.g., text only) to the formatting of the copied information. In some embodiments, editing or format modification performed on the pasted information by an electronic communication program does not affect ECMP program 300. In one example, a user may apply a style (e.g., font bold and italicized, color blue) to the pasted information for emphasis. In another example, a user may delete a portion of the pasted information to save space.

In step 314, ECMP program 300 adds the meta-data extracted from the enhance clipboard to the electronic communication. ECMP program 300 adds the meta-data extracted by enhanced clipboard program 200 (from step 208) as meta-data associated with the electronic communication.

In further embodiments, ECMP program 300 may provide a user one or more utilities to edit the meta-data associated with an electronic communication. In one scenario, ECMP program 300 detects that a user of client device 120 archives a processed (e.g., replied to, saved, forwarded, etc.) electronic communication. However, the meta-data may be no longer be relevant to the electronic communication (e.g., conversation thread) and may be deleted by the user. In one example, the sender of an electronic communication, towards the beginning of a conversation thread, may set an expiration period on an electronic communication. ECMP program 300 may permit a user, via UI 122, to remove the references to the expired electronic communication.

In step 316, ECMP program 300 utilizes an electronic communication program. In an embodiment, ECMP program 300 interfaces with an electronic communication program (e.g., an e-mail program, an IM program, a calendar function, etc.) to process (e.g., send) an electronic communication that was modified utilizing information obtained from enhanced clipboard program 200. In one scenario, ECMP program 300 interfaces with electronic communication program 126 executing on client device 120. In another scenario, ECMP program 300 interfaces with hosted electronic communication program 106 executing on server 102.

In some embodiments, ECMP program 300 interfaces with an electronic communication program to save an electronic communication without sending the electronic communication. For example, a user of client device 120 requires additional content to complete an electronic communication so the electronic communication is saved by electronic communication program 126 as a draft electronic communication in file storage 124. In other embodiments, ECMP program 300 pauses to have additional content included in an electronic communication. In one scenario, ECMP program 300 permits additional information to be pasted from another instance of enhanced clipboard program 200 (step 312), and the meta-data associated with the pasted information is included (step 314) in the electronic communication. In another scenario, ECMP program 300 permits a user of client device 120 to continue to add information (e.g., write, edit, paste from basic clipboard function) to an electronic communication prior to saving or sending the electronic communication.

Figure 4:
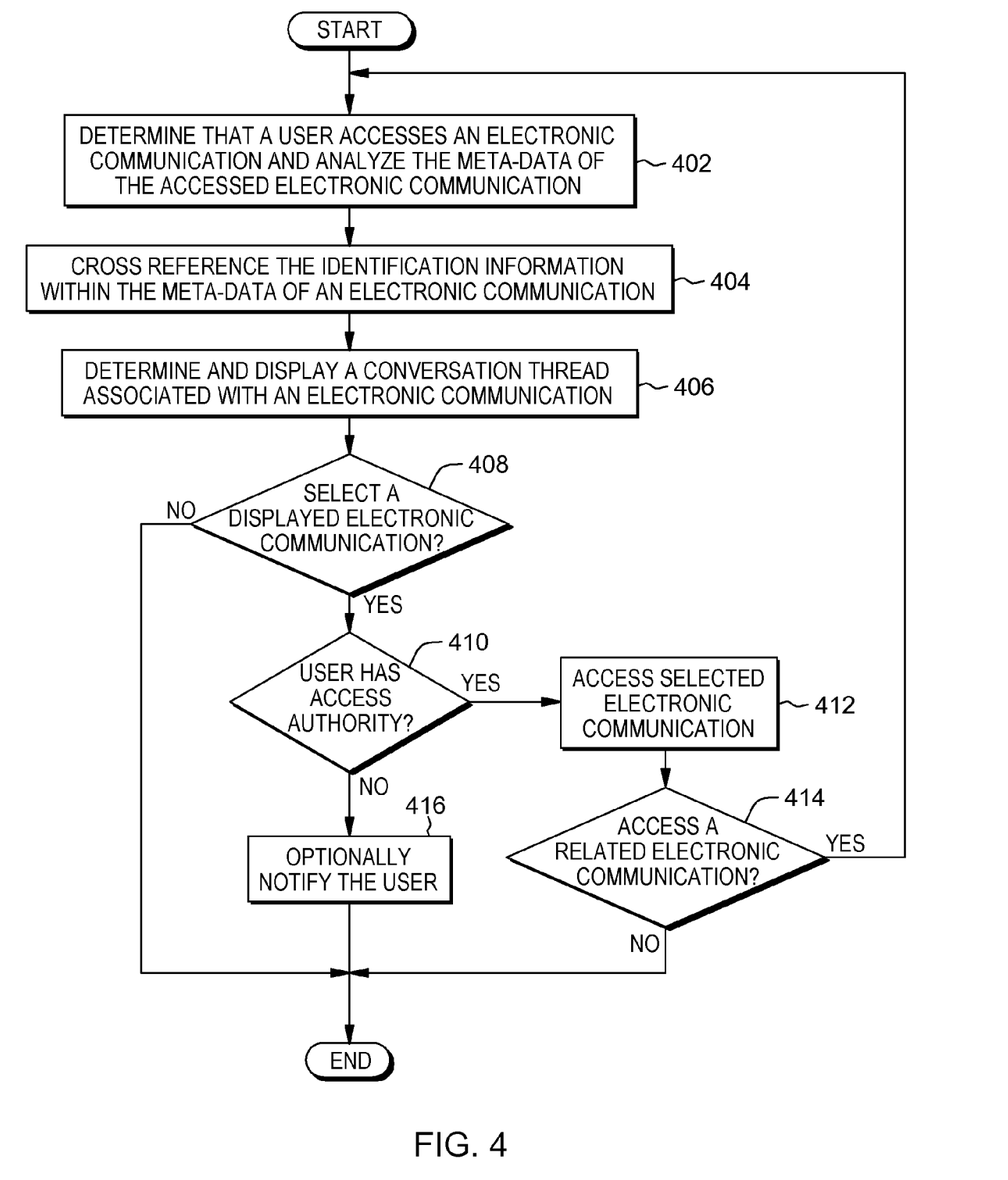
FIG. 4 depicts a flowchart of the operational steps of a conversation thread mapping program, in accordance with an embodiment of the present invention.

FIG. 4 is a flowchart depicting operational steps for CTM program 400, a program for mapping one or more threads associated with an electronic communication, in accordance with embodiments of the present invention.

In step 402, CTM program 400 determines that a user accesses an electronic communication, and CTM program 400 analyzes the meta-data of the accessed electronic communication. For example, CTM program 400 detects (e.g., identifies) that a user of client device 120 accesses an electronic communication utilizing electronic communication program 126. Accessed electronic communication may include: newly received electronic communications, electronic communication within the inbox of a user, electronic communications in-process in a draft folder, electronic communications stored in folders, and processed electronic communications that are a part of another program (e.g., a calendar function). CTM program 400 subsequently analyzes the accessed electronic communication to determine whether multiple unique identifiers or other indicators exist within the meta-data signifying that the electronic communication is part of a conversation thread.

In one embodiment, CTM program 400 determines that a user of client device 120 accesses a received electronic communication and analyzes the meta-data associated with the accessed electronic communication. In another embodiment, CTM program 400 determines (e.g., identifies) that a user of client device 120 accesses a stored electronic communication and analyzes the meta-data associated with the stored electronic communication. In some embodiments, CTM program 400 analyzes the meta-data within an electronic communication and determines that one or more unique identifiers exist. In some instances, CTM program 400 may determine that the meta-data contains a single unique identifier signifying that the electronic communication is the beginning of a conversation thread.

In step 404, CTM program 400 cross-references the identification information within meta-data of an electronic communication. In some embodiments, CTM program 400 utilizes the unique identification information (e.g., the UUIDs) within the metadata of an electronic communication to cross-reference and identify other electronic communications (e.g., child nodes) that are associated with one or more conversation threads of the electronic communication. In one scenario, CTM program 400 may interface with an electronic communication program (e.g., electronic communication program 126) on client device 120 to determine which electronic communications are associated with the one or more conversation threads associated with the electronic communication. In one scenario, CTM program 400 may interface with an electronic communication program (e.g., hosted electronic communication program 106) on server 102 to determine which electronic communications are associated with the one or more conversation threads associated with the electronic communication. In some scenarios, CTM program 400 may utilize the unique identification information to cross-reference the electronic communication within an enterprise communication environment.

In step 406, CTM program 400 determines and displays a conversation thread associated an electronic communication. CTM program 400 may utilize one or more user preferences to determine how to display the electronic communications associated a conversation thread. User preferences may include: color coding electronic communication by author, information displayed (e.g., time & date, subject, author, other user on carbon-copy, etc.), analysis depth (e.g., the degree of separation for communication nodes), etc. In some embodiments, CTM program 400 displays electronic communications in a separate window within UI 122. In other embodiments, CTM program 400 displays electronic communications within the GUI associated with an electronic communication program (e.g., electronic communication program 126).

In one example, CTM program 400 may display the electronic communications in a tree structure. In another example, CTM program 400 may display the electronic communications in chronological order with the electronic communication accessed by the user highlighted. In another example, CTM program 400 displays the electronic communications associated with the one or more conversation threads in a hierarchical format. In addition, CTM program 400 may include a value that is displayed with the electronic communication to identify the electronic communication. In one embodiment, CTM program 400 displays the active electronic communications that are associated with the accessed electronic communication. In one scenario, deleted or archived electronic communications are not displayed. In another scenario, CTM program 400 restricts the display of electronic communication to the electronic communication that the user directly accessed. In yet another scenario, CTM program 400 adds placeholders in the display of electronic communications for a conversation thread that did not include the user.

Referring to step 406, in another embodiment, CTM program 400 displays electronic communications associated with a conversation thread. CTM program 400 may utilize current and historical cross-reference information (e.g., indexes) to determine the status of electronic communications associated with the unique identifiers within the meta-data of the accessed electronic communication, prior electronic communications, and subsequent electronic communications. For example, CTM program 400 constrains the displayed electronic communication to the electronic communications within an identified communication thread as opposed to general replies or comments to an electronic conversation which do not incorporate pasted content or at least some reference information (e.g., reply with history but without attachments).

In decision step 408, CTM program 400 determines whether a user selects a displayed electronic communication from the electronic communications associated with a conversation thread. For example, CTM program 400 may determine which electronic communication is selected by mouse-clicking actions of a user on an electronic communication displayed in UI 122. In another example, CTM program 400 may determine which electronic communication is selected by a value input by a user to UI 122 that was displayed with the electronic communication.

In decision step 408, in response to a determination that a user does not select a displayed electronic communication (no branch, decision step 408), CTM program 400 terminates. For example, CTM program 400 detects that a user closes the instance of UI 122 that is displaying the conversation threads.

In decision step 408, in response to a determination that a user does select a displayed electronic communication (yes branch, decision step 408), CTM program 400 determines whether a user has authority to access the selected electronic communication (decision step 410).

In decision step 410, CTM program 400 determines whether a user may access the selected electronic communication from the electronic communications associated with a conversation thread. In one embodiment, CTM program 400 determines that a user has authority to access a selected electronic communication by identifying which electronic communications that the user has directly accessed. For example, direct access by a user to an electronic communication includes the user: sending the electronic communication, receiving the electronic communication, forwarding the electronic communication, replying to the electronic communication, etc. In one scenario, CTM program 400 determines that a user has directly accessed an electronic communication by identifying the log files associated with an electronic communication program (e.g., hosted electronic communication program 106, electronic communication program 126). In another scenario, CTM program 400 determines that a user has directly accessed an electronic communication by identifying the electronic communication within the file storage (e.g., file storage 124, file storage 104) associated with an electronic communication program. In some scenarios, CTM program 400 determines that a user has directly accessed an electronic communication by identifying the ID of a user within the meta-data of the selected electronic communication.

In another embodiment, CTM program 400 determines that a user has directly accessed an electronic communication by identifying which electronic communications are associated with the user for the cross-referenced unique identifiers associated with the selected electronic communication. For example, CTM program 400 interfaces with server 102, the server for an enterprise-based office productivity suite that includes the cross-references (e.g., indexes) of unique identifiers associated with the selected electronic communication.

In decision step 410, response to a determination that a user has authority to access the selected electronic communication (yes branch, decision step 410), CTM program 400 accesses the selected electronic communication (step 412).

In step 412, CTM program 400 accesses the electronic communication selected by a user. In one embodiment, CTM program 400 may access the selected electronic communication from the electronic communications stored on client device 120. In another embodiment, CTM program 400 may access the selected electronic communication within file storage 104 on server 102. In one scenario, CTM program 400 accesses the selected electronic communication within storage allocated to the user. In another scenario, CTM program 400 accesses the selected electronic communication within storage shared by a plurality of users. In a further embodiment, CTM program 400 locates and accesses the selected communication from an archive of electronic communications. For example, a user deleted the selected electronic communication from client device 120. However, CTM program 400 determines that an electronic communication program maintains archived copies of electronic communications on server 102. Subsequently, CTM program 400 un-archives and accesses the selected electronic communication for the user.

In some embodiments, CTM program 400 displays the accessed electronic communication in a GUI window within UI 122 that is associated with CTM program 400. In other embodiments, CTM program 400 interfaces with an electronic communication program and utilizes the GUI associated with the electronic communication program to display the accessed electronic communication.

In decision step 414, CTM program 400 determines whether a user accesses a related electronic communication. CTM program 400 determines that a user accesses a related electronic communication when a user selects the GUI displaying a conversation thread (step 406) and selects another electronic communication.

In decision step 414, in response to a determination that a user accesses a related electronic communication (yes branch, decision step 414), CTM program 400 loops to step 402 to analyze the meta-data of the accessed electronic communication. In decision step 414, in response to a determination that a user does not access a related electronic communication (no branch, decision step 414), CTM program 400 terminates.

Referring to decision step 410, in response to determining that a user does not have authority to access a selected electronic communication (no branch, decision step 410), CTM program 400 may notify the user of client device 120 (step 416).

In step 416, CTM program 400 optionally notifies the user of client device 120 that the user does not have the authority to access a selected electronic. In one embodiment, CTM program 400, based on one or more user and/or electronic communication program preferences or constraints, does not notify a user that the user does not have authority to access the selected electronic communication. In another embodiment, CTM program 400 may activate UI 122 to notify a user that the user does not have authority to access a selected electronic communication from the electronic communications that are associated with a conversation thread. In some embodiments, CTM program 400 may transmit an access attempt notification to the owner of the selected electronic communication.

In a further embodiment, CTM program 400 may provide a user of client device 120 information as to which user initiated (e.g., owns) the electronic communication that the user of client device 120 lacks authority to access. In one scenario, CTM program 400 anonymizes ID of the owner of the selected electronic communication. CTM program 400, subsequently, interfaces with an electronic communication program (e.g., electronic communication program 126) to send a message to the owner of the selected electronic communication to request access permission. In another scenario, CTM program 400 displays the owner of the selected electronic communication. In some embodiments, CTM program 400 remains active and provides capabilities for a user to request access to the selected electronic communication. In other embodiments, CTM program 400 terminates and delegates obtaining access for the selected electronic communication to the user.

Figure 5:
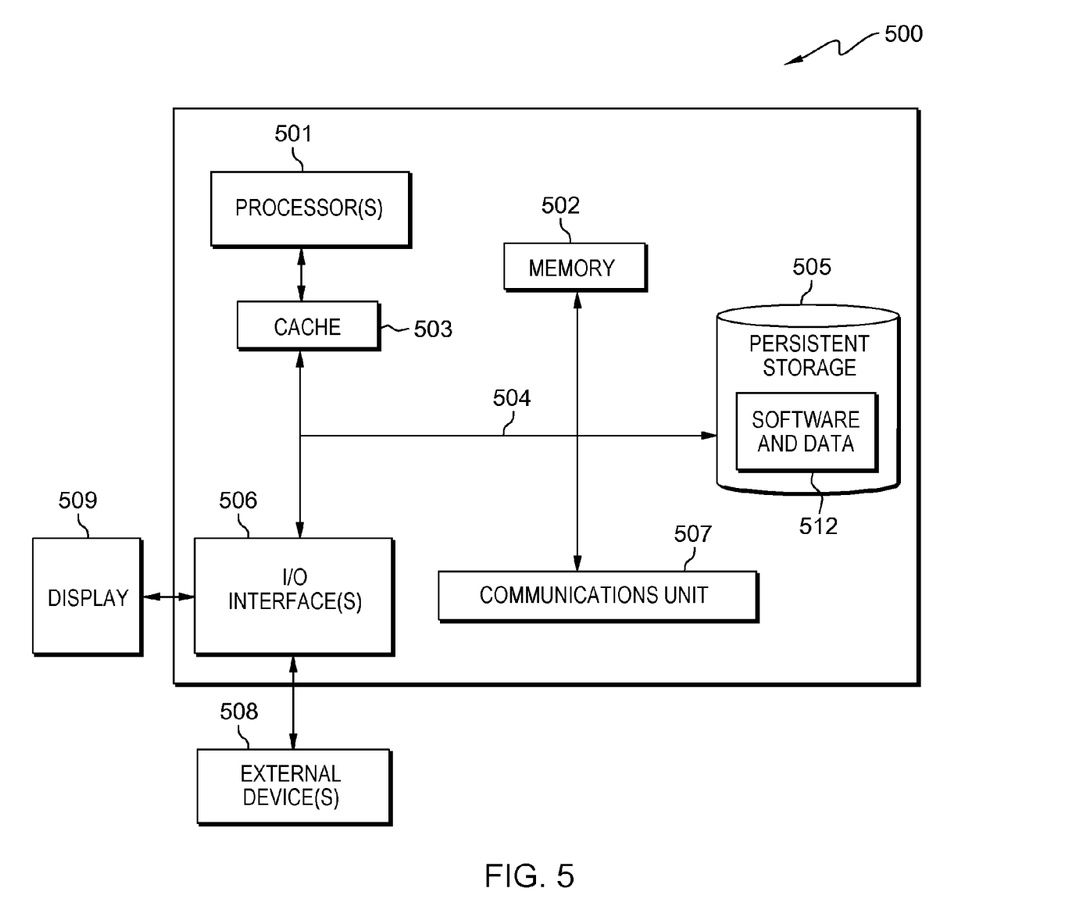
FIG. 5 is a block diagram of components of a computer, in accordance with an embodiment of the present invention.

FIG. 5 depicts computer system 500, which is representative of server 102 and client device 120. Computer system 500 is an example of a system that includes software and data 512. Computer system 500 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to server 102, software and data 512 includes file storage 104, hosted electronic communication program 106, and various programs (not shown). With respect to client device 120, software and data 512 includes user interface (UI) 122, file storage 124, enhanced clipboard program 200, ECMP program 300, CTM program 400, electronic communication program 126, and various programs (not shown).

Communications unit 507, in these examples, provides for communications with other data processing systems or devices, including resources of server 102, client device 120. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for identifying a conversation thread among electronic communications, the computer system comprising:

one or more computer processors;

one or more computer readable storage media; and program instructions stored on the computer readable storage media for execution by at least one of the one or more processors, the program instructions comprising:

program instructions to identify that a user accesses a first electronic communication from a plurality of electronic communications, wherein the plurality of electronic communications include: received electronic communications, sent electronic communications, filed electronic communications, drafted electronic communications, and stored electronic communications;

program instructions to analyze meta-data of the first electronic communication to identify at least one unique identifier included in the meta-data of the first electronic communication;

wherein a unique identifier is a universally unique identifier (UUID); and wherein the UUID is further defined by a UUID specification that is identified by a variant value and a version value; and wherein the at least one unique identifier includes a first UUID;

program instructions to determine that the first electronic communication includes a portion of content copied from at least one other electronic communication based on identifying one or more UUIDs within the meta-data of the first electronic communication, wherein UUIDs are included in a database that includes cross-references between the plurality of electronic communications, the copied content, and the identified UUIDs;

program instructions to identify at least one additional electronic communication from the plurality of electronic communications, wherein an electronic communication is identified for each identified UUID based on the cross-references within the database;
program instructions to display, to the user, a conversation thread that includes the at least one additional electronic communications respectively associated with a UUID identified within the meta-data of the first electronic communication;
program instructions to receive from the user, a selection of an electronic communication from the at least one additional electronic communications displayed as the conversation thread, wherein the selected electronic communication is a second electronic communication;
program instructions to determine whether the user has authority to access the selected second electronic communication, wherein determining that the user has authority to access the selected second electronic communication is based on a log file of an electronic communication program, wherein the log file identifies electronic communications accessed by the user; and
responsive to determining that the user accessing the first electronic communication has authority to access the selected second electronic communication, program instructions to access the selected second electronic communication.

* * * * *